(12) United States Patent
Ogawa et al.

(10) Patent No.: US 6,359,273 B1
(45) Date of Patent: Mar. 19, 2002

(54) METHOD AND APPARATUS FOR PRODUCING A UNIFIED LAMINATED BODY BY DIELECTRIC HEATING AND METHOD FOR DIELECTRICALLY PREHEATING A LAMINATE STRUCTURE FOR THE UNIFIED LAMINATED BODY

(75) Inventors: Kiyoshi Ogawa, Kitakatsuragi-gun; Takahiko Yoshida, Kashihara; Michiaki Inui, Yamatokohriyama; Mikiya Shimizu, Ikoma-gun; Yasuji Yamamoto, Osaka; Yuichi Sugizaki, Kashihara; Tsuneo Nagata, Kitakatsuragi-gun, all of (JP)

(73) Assignee: Nitta Corporation (JP)

( * ) Notice: Subject to any disclaimer, the term of this patent is extended or adjusted under 35 U.S.C. 154(b) by 0 days.

(21) Appl. No.: 09/485,324
(22) PCT Filed: Aug. 6, 1998
(86) PCT No.: PCT/JP98/03506
  § 371 Date: Jun. 30, 2000
  § 102(e) Date: Jun. 30, 2000
(87) PCT Pub. No.: WO99/07750
  PCT Pub. Date: Feb. 18, 1999

(30) Foreign Application Priority Data

Aug. 6, 1997 (JP) ............................................... 9-212263
Aug. 6, 1997 (JP) ............................................... 9-212264

(51) Int. Cl.$^7$ ........................... H05B 6/54; B29C 33/08
(52) U.S. Cl. ...................... 219/765; 219/773; 219/777; 156/274.4; 156/275.5; 156/380.2; 156/380.6
(58) Field of Search .................................. 219/765, 767, 219/770, 773, 777, 780, 633, 645; 156/274.4, 273.7, 274.6, 275.5, 379.8, 380.2, 380.3, 380.4, 380.6; 425/174.8 R, 174.8 E

(56) References Cited

U.S. PATENT DOCUMENTS

| 2,040,760 | A | * | 5/1936 | Northrup ..................... 219/645 |
| 4,258,240 | A | * | 3/1981 | Pless ........................... 219/778 |
| 4,352,709 | A | * | 10/1982 | Urai et al. ................... 219/765 |
| 5,245,154 | A | * | 9/1993 | Sato et al. ................... 219/777 |
| 5,647,940 | A | * | 7/1997 | Ceraso ........................ 219/765 |
| 6,109,903 | A | * | 8/2000 | Inoue et al. ............. 156/379.7 |

FOREIGN PATENT DOCUMENTS

| JP | 56-148521 | | 11/1981 |
| JP | 61-49832 | | 3/1986 |
| JP | 61-51536 | | 11/1986 |
| JP | 62-41861 | | 9/1987 |
| JP | 1-255526 | * | 10/1989 |
| JP | 5-4889 | | 1/1993 |
| JP | 8-332646 | | 12/1996 |
| JP | 9-66592 | * | 3/1997 |

* cited by examiner

Primary Examiner—Philip H. Leung
(74) Attorney, Agent, or Firm—Morrison Law Firm

(57) ABSTRACT

A method of preheating a polymer plate by dielectric heating by applying a radio frequency voltage to a laminate in the direction of its lamination through electrodes; a method of producing a laminate, comprising dielectric heating a polymer plate by applying a radio frequency voltage to a laminate in the direction of its lamination through electrodes in a state where the laminate is housed in an annular container encompassing the surfaces of the laminates, and pressing the laminate in the direction of its lamination at least after completion of the application of the radio frequency voltage; and an apparatus for producing the laminate.

39 Claims, 10 Drawing Sheets

METHOD AND APPARATUS FOR PRODUCING A UNIFIED LAMINATED BODY BY DIELECTRIC HEATING AND METHOD FOR DIELECTRICALLY PREHEATING A LAMINATE STRUCTURE FOR THE UNIFIED LAMINATED BODY

FIELD OF THE INVENTION

The present invention relates to a method for preheating a laminate structure in which a plurality of polymer plates and conductive metal plates are laminated alternately, and a method and apparatus for manufacturing a laminated body.

PRIOR ART

Such laminated bodies include, for instance, a laminated rubber body and are variously used for antiseismic or quake-absorbing apparatus and the like.

The laminated rubber body is manufactured by alternately laminating steel plates and raw rubber plates within a mold, and, during heating the mold, pressure is applied by a press machine.

However, since a raw rubber plate as a constituent of the laminated rubber body has a small thermal conductivity, there is a big difference in rising speed of temperature between a portion of the plate close to a heat source and another portion remote therefrom. This causes an uneven cure of raw rubber plates and thereby results in uniformless adherence between raw rubber plates and steel plates and unevenness in substantial characteristics of the resultant laminated rubber body. While it is possible to secure a certain degree of substantial characteristics by gently raising the temperature of the sold, the molding time would be greatly prolonged. In this respect, in order to reduce the time for pressure molding and stabilize substantial characteristics, there have been recently employed the following methods (1) (2) wherein raw rubber plates and steel plates are heated in advance up to a temperature not to cause any trouble in their substantial characteristics and workability before cure-adhesion thereof. However, each still has drawbacks.

(1) Method 1

In this method, layers made of a raw rubber plate and a steel plate to be laminated are respectively preheated.

Referring to FIG. 4, in this method, each layer made of a raw rubber plate 1 and a steel plate 2' is placed on each of a plurality of shelves t within a drying oven K', and heated up respectively by hot blast (shown by rightward arrows).

In this method, after preheating, the layers of the raw rubber and steel plates 1, 2' need to be laid and combined together in the mold for subsequent pressure molding. However, since a rise in temperature makes the raw rubber plates 1 soft and this makes laying work difficult, the practical preheating temperature will be limited. As a result, an initial curing temperature cannot be high, and reducing the curing time will not be effectively achieved.

(2) Method 2

In this method, a plurality of raw rubber plates and steel plates are alternately disposed and then preheated as one combined body.

Referring to FIG. 5, in this method, using a center core A1' and an outer frame A2' arranged within a drying oven K', a plurality of raw rubber plates 1 and steel plates 2' are disposed alternately and then heated as one body by hot blast (shown by rightward arrows).

In this method, since superposing layers after preheating can be eliminated, the preheating temperature can be raised relatively high. However, this method employs a heating system from outside by hot blast, rise in temperature of an inner layer is delayed compared with that of an outer layer. This is apparent from FIG. 2, after 120 minutes from the start of heating, the outside rubber reaches a preheating limit temperature of 80° C., but the temperature of the inside rubber only rises up to approximately 60° C. Therefore, in order to obtain a substantially uniform temperature distribution of the laminate structure, heating must be performed gently, not rapidly, and this prolongs the preheating time. As a result, the time for pressure molding will not be effectively reduced.

The data of FIG. 2 were obtained under the following conditions.

Raw Rubber Plate 1
diameter: 520 ma, thickness: 6 mm, hole diameter: 90 mm
Steel plate 2'
diameter: 500 mm, thickness: 3 mm, hole diameter: 90 mm Flange
diameter 500 mm, thickness: 25 mm, hole diameter: 90 mm Temperature of hot blast
80° C.

Instead of raw rubber plates, polymer plates may be used in laminated bodies utilized for various purposes other than for antiseismic or quake-absorbing apparatus. Such polymer plates may also be required in some instances to be heated up to a desired temperature with a uniform temperature distribution and in a short time.

Next, the combined rubber body is further processed by (1) heating it up to a rubber fluidizing temperature (80–95° C.) and pressing it to form an integrated laminated rubber body, and (2) securing its desired product dimensions by suppressing thermal vertical expansion of the laminated rubber body and, under a constant pressed condition, curing the rubber and cure-adhering the steel and rubber plates (a cure-adhesion temperature 110–125° C.). However, since the raw rubber plates as constituent of the laminated rubber body have a small thermal conductivity, there is a large difference in temperature rising speed between a portion of the rubber close to a heat source and another portion remote therefrom. This causes uneven curing and thereby results in unevenness in substantial characteristics of the laminated rubber body (vertical elastic modulus, shear modulus, adhesion between raw rubber plates and steel plates, etc.).

Various methods have been tried to overcome these problems but temperature difference between inside and outside portions could not be eliminated. As a result, in order to avoid bad influence to products, the molding time must be prolonged. Further, measures for improvement requires a number of processes and an innovative method has not been found yet.

In case of adhesion of other type of laminated structures such as with synthetic resin plates or ceramics plates and conductive metal plates, there may be also a problem due to the temperature difference between inside and outside portions.

SUMMARY OF THE INVENTION

In is an object of the present invention to provide a method for preheating a laminate structure in which polymer plates incorporated in the structure are heated up to a desired temperature with a substantially uniform temperature distribution and in a short time. It is another object of the present invention to provide a method and apparatus for manufacturing a laminated body with which a laminate structure is heated up to a specific temperature range with few temperature difference between an inner and an outer portion thereof and in a short time.

In order to achieve the above objects, the present invention includes the following means.

According to a first embodiment of the present invention, there is provided a method for preheating a laminate structure which includes applying through electrodes a high-frequency voltage in a lamination direction of the laminate structure having alternate lamination with a plurality of polymer plates and conductive metal plates, so as to dielectrically heat said polymer plates.

According to a preferred embodiment of the present invention, in the above method for preheating a laminate structure, the plurality of conductive metal plates are parallel with each other.

According a preferred embodiment of the present invention, in the above method for preheating a laminate structure, intervals between any adjacent conductive metal plates are substantially the same.

According a preferred embodiment of the present invention, in the above method for preheating a laminate structure, the high-frequency voltage is applied between the electrodes disposed on opposite ends of the laminate structure in the lamination direction.

According a preferred embodiment of the present invention, in the above method for preheating a laminate structure, the outermost opposite conductive metal plates of the laminate structure function as the electrodes.

According a preferred embodiment of the present invention, in the above method for preheating a laminate structure, flanges made of conductive metal plate are provided on outer faces of the outermost opposite plates of the laminate structure and function as the electrodes.

According a preferred embodiment of the present invention, in the above method for preheating a laminate structure, conductive metal plates are provided in a manner of contacting with outer faces of the outermost opposite plates of the laminate structure and function as the electrodes.

According a preferred embodiment of the present invention, in the above method for preheating a laminate structure, the electrodes are heated by heating means.

According a preferred embodiment of the present invention, in the above method for preheating a laminate structure, the laminate structure has a through bore in the lamination direction and a core member made of non-conductive material is inserted into the through hole so as to position the plurality of polymer and conductive metal plates.

According a preferred embodiment of the present invention, in the above method for preheating a laminate structure, an annular housing member surrounds the laminate structure in contact with the peripheral lamination surface thereof so as to position the plurality of polymer and conductive metal plates.

According a preferred embodiment of the present invention, in the above method for preheating a laminate structure, at least one of the housing member and the core member has a coefficient of dielectric loss not higher than 0.3.

According to a further embodiment of the present invention, there is provided a method for manufacturing a laminated body which includes accommodating an alternate laminate structure with a plurality of polymer plates and conductive metal plates in an annular housing member which is made of nonconductive material and surrounds the laminate structure in contact with the peripheral lamination surface thereof, applying through electrodes a high-frequency voltage to the laminate structure in a lamination direction so as to dielectrically heat the polymer plates, and applying pressure to the laminate structure in the lamination direction by a pressing means at least after completion of the high-frequency voltage applying process.

According a preferred embodiment of the present invention, in the above method for manufacturing a laminated body, the plurality of conductive metal plates are parallel to each other.

According a preferred embodiment of the present invention, in the above method for manufacturing a laminated body, intervals between any adjacent metal plates are substantially the same.

According a preferred embodiment of the present invention, in the above method for manufacturing a laminated body, heating by heating means is also provided under the process of applying the high-frequency voltage.

According a preferred embodiment of the present invention, in the above method for manufacturing a laminated body, polarity of the high-frequency voltage is reversed every fixed time.

According a preferred embodiment of the present invention, in the above method for manufacturing a laminated body, the high-frequency voltage is applied between the electrodes provided on opposite ends of the laminate structure in the lamination direction.

According a preferred embodiment of the present invention, in the above method for manufacturing a laminated body, the electrodes are the outermost opposite conductive metal plates of the laminate structure.

According a preferred embodiment of the present invention, in the above method for manufacturing a laminated body, the electrodes are flanges made of conductive metal plates and provided on the opposite outermost sides of the laminate structure.

According a preferred embodiment of the present invention, in the above method for manufacturing a laminated body, the electrodes are conductive metal plates provided in a manner of contacting with the outer faces of the outermost opposite plates of the laminate structure.

According a preferred embodiment of the present invention, in the above method for manufacturing a laminated body, the electrodes are pressing plates made of conductive metal plate as the pressing means.

According a preferred embodiment of the present invention, in the above method for manufacturing a laminated body, the electrodes are heated by heating means.

According a preferred embodiment of the present invention, in the above method for manufacturing a laminated body, the dielectric heating is conducted in a manner such that a central core made of non-conductive material is inserted in a through bore of the laminate structure extending in the lamination direction.

According to another embodiment of the present invention, there is provided an apparatus for manufacturing a laminated body which is for heat integrating an alternate laminate structure with a plurality of polymer plates and conductive metal plates, and includes an annular housing member which is made of non-conductive material and surrounds the laminate structure in contact with the peripheral lamination surface thereof, dielectric heating means for dielectrically heating the polymer plates by applying a high-frequency voltage in a lamination direction of the laminate structure through electrodes, and pressing means to press the laminate structure in the lamination direction.

According a preferred embodiment of the present invention, in the above apparatus for manufacturing a laminated body, the pressing means gives pressure at least after completion of a high-frequency voltage applying process.

According a preferred embodiment of the present invention, in the above apparatus for manufacturing a laminated body, the dielectric heating means has switching means for reversing polarity of the high-frequency voltage every fixed time.

According a preferred embodiment of the present invention, in the above apparatus for manufacturing a laminated body, electrodes receiving the high-frequency voltage are provided at opposite ends of the laminate structure in the lamination direction.

According a preferred embodiment of the present invention, in the above apparatus for manufacturing a laminated body, the outermost opposite conductive metal plates of the laminate structure function as the electrodes, and the dielectric heating means is capable of applying the high-frequency voltage between these outermost opposite conductive metal plates.

According a preferred embodiment of the present invention, in the above apparatus for manufacturing a laminated body, flanges made of conductive metal plates and provided on the outermost opposite sides of the laminate structure function as the electrodes, and the dielectric heating means is capable of applying the high-frequency voltage between these flanges.

According a preferred embodiment of the present invention, in the above apparatus for manufacturing a laminated body, conductive metal plates provided in a manner of contacting with the outer faces of the outermost opposite plates of the laminate structure function as the electrodes, and the dielectric heating means is capable of applying the high-frequency voltage between the conductive metal plates.

According a preferred embodiment of the present invention, in the above apparatus for manufacturing a laminated body, the pressing means includes a pressing plate made of conductive metal material and applies pressure to the laminate structure during the dielectric heating, and the dielectric heating means is capable of applying the high-frequency voltage between these pressing plates.

According a preferred embodiment of the present invention, in the above apparatus for manufacturing a laminated body, the electrodes are provided with heating means.

According a preferred embodiment of the present invention, the above apparatus for manufacturing a laminated body further includes a non-conductive positioning means for positioning the plurality of polymer and conductive metal plates to be laminated, the positioning means includes a core member to be inserted in a through bore provided in the laminate structure and extending in the lamination direction.

According a preferred embodiment of the present invention, in the above apparatus for manufacturing a laminated body, at least one of the housing member and the core member has a coefficient of dielectric loss not higher than 0.3.

According a preferred embodiment of the present invention, in the above apparatus for manufacturing a laminated body, the housing member is a split-mold.

According a preferred embodiment of the present invention, in the above apparatus for manufacturing a laminated body, the positioning means supports the peripheral lamination surface of the laminate structure.

According a preferred embodiment of the present invention, in the above apparatus for manufacturing a laminated body, the laminate structure has a through bore extending in the lamination direction and the positioning means supports an inner peripheral surface of the laminate structure which defines the through bore.

According a preferred embodiment of the present invention, in the above apparatus for manufacturing a laminated body, the positioning means has a coefficient of dielectric loss not higher than 0.3.

DETAILED DESCRIPTION OF THE INVENTION

Some preferred embodiments according to the present invention are described with reference to the accompanying drawings.

A. Preheating of a Laminate Structure

Figure 1:
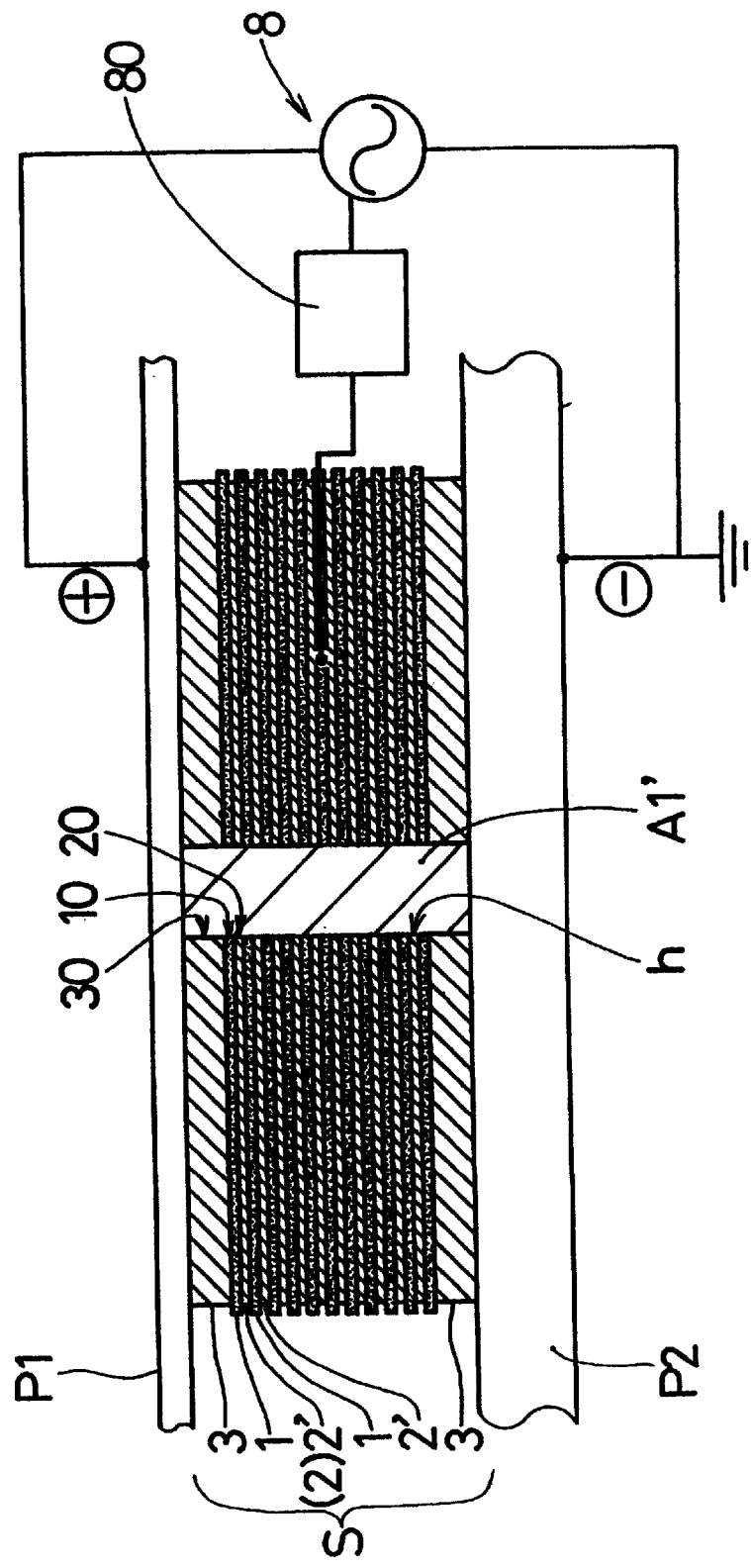
FIG. 1 is an explanatory diagram of an embodiment of apparatus for preheating a laminate structure according to the present invention.

FIG. 1 shows an embodiment of apparatus for preheating a laminate structure of the present invention. In this embodiment, the apparatus preheats rubber layers incorporated in a laminate structure S with flanges by a dielectric heating method. The laminate structure S is sandwiched by parallel electrode plates P1, P2 provided along the laminated layers in a lamination direction (vertically in the drawing), and a high-frequency voltage generated by a high-frequency oscillator 8 is applied to and between the parallel electrode plates P1, P2 so as to generate internal heat in respective rubber plate layers 1. The laminate structure S has a bore h in its center, and is positioned in a manner such that a central core A1', which is made of non-conductive material, is inserted into the bore h.

Major constituent elements of the preheating apparatus are described in details hereinafter (a) Laminate Structure S Referring to FIG. 1, the laminate structure S includes circular raw rubber plates 1 with holes 10 and steel plates 2' with holes 20 (corresponding to the conductive metal plates 2 in this specification) which are laminated alternately, and further includes flanges 3 with holes 30 respectively arranged on its upper and lower sides.

Figure 2:
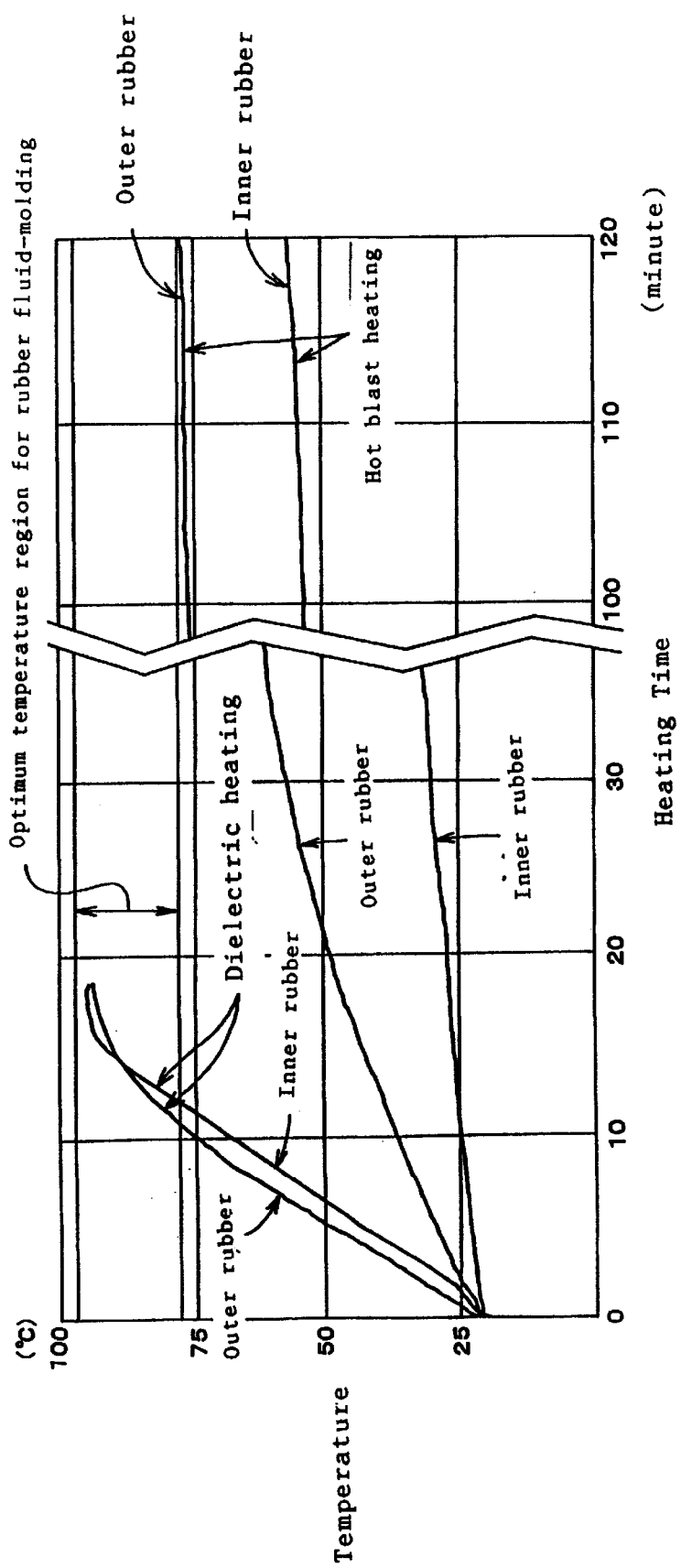
FIG. 2 is a graph of the results of preheating (relationship between the temperature and the heating time) comparing the case using the prior art method 2 and the case using the method according to the present invention.

The holes 10, 20, 30 constitute the bore h and have the same diameter. The steel plates 2' and the flanges 3 have the same diameter, and the diameter of the raw rubber plates 1 is slightly larger than that of the steel plates 2' or the flanges 3. Their specific dimensions are the same as those of FIG. 2 stated above under PRIOR ART.

(b) High-Frequency Oscillator 8

The high-frequency oscillator 8 is constituted with a known circuit, and set to generate a frequency of 13.6 MHz. A frequency used in high-frequency dielectric heating is generally in the range of 4–80 MHz, but any frequency in the range of 1–300 MHz may be applicable.

As shown in FIG. 1, the high-frequency oscillator 8 is provided with a temperature sensor 80 for detecting the temperature of raw rubber plates 1 and stops the output when the temperature reaches 85° C.

(c) Central Core A1'

Material having a loss coefficient (dielectric constant× dielectric loss tangent) of not higher than 0.3, preferably not higher than 0.15 (measuring method: JIS/Japanese Industrial Standard K 6911, testing conditions: temperature 20±2° C., relative humidity 65±5%, testing frequency: 1 MHz), superiority in strength and heat resistance, a small coefficient of linear expansion and a low absorption rate, and being available at low cost, is suitable for the central core A1'. Particular examples include compounds of phenol resin, epoxy resin, ester resin and respective glass fibers, and ceramics. It should be noted that the reason why the loss coefficient is set to not higher than 0.3 is that, if it becomes larger than 0.3, internally generated heat of the central core A1' becomes extremely higher than that of the raw rubber plates 1 so that the temperature of the vicinity of the central core A1' rises locally and thereby resulting in failure of uniform heating of the raw rubber plates 1.

(d) Function of the Preheating Apparatus

Referring to FIG. 1, when the laminate structure S is positioned between the parallel electrode plates P1, P2 and a high-frequency voltage generated by the high-frequency oscillator 8 is applied to and between the parallel electrode plates P1, P2, the steel plates 2' disposed at equal intervals function as intermediate electrode plates and the raw rubber plates 1 are all heated at both the inner and outer portions simultaneously. Consequently, the raw rubber plates 1 are substantially uniformly heated in a short time. This is apparent from FIG. 2. That is, with this apparatus, the raw rubber plates 1 can be heated up to approximately 70° C. by a 12 minutes' output of the high-frequency oscillator 8 and moreover, the temperature difference between the inner and outer portions at that time is as small as approximately 5° C.

(e) Others (1) It is preferable to simultaneously employ an external heating method for the upper and lower plates, i.e. the above-described parallel electrode plates P1, P2. The method is, for example, to let vapor or heated fluid such as oil flow within the respective upper and lower plates, or to embed electro-thermal lines within these plates. In this case, uniform heating in vertical directions can be further improved. This is because drop in temperature due to heat radiation from the upper and lower sides of the laminate structure S can be prevented. This also applies to an arrangement in which heat boards are contacted with the parallel electrode plates P1, P2 in a manner of allowing heat transfer.

The temperature of the upper and lower plates or the heat boards is set to 85° C.

Figure 5:
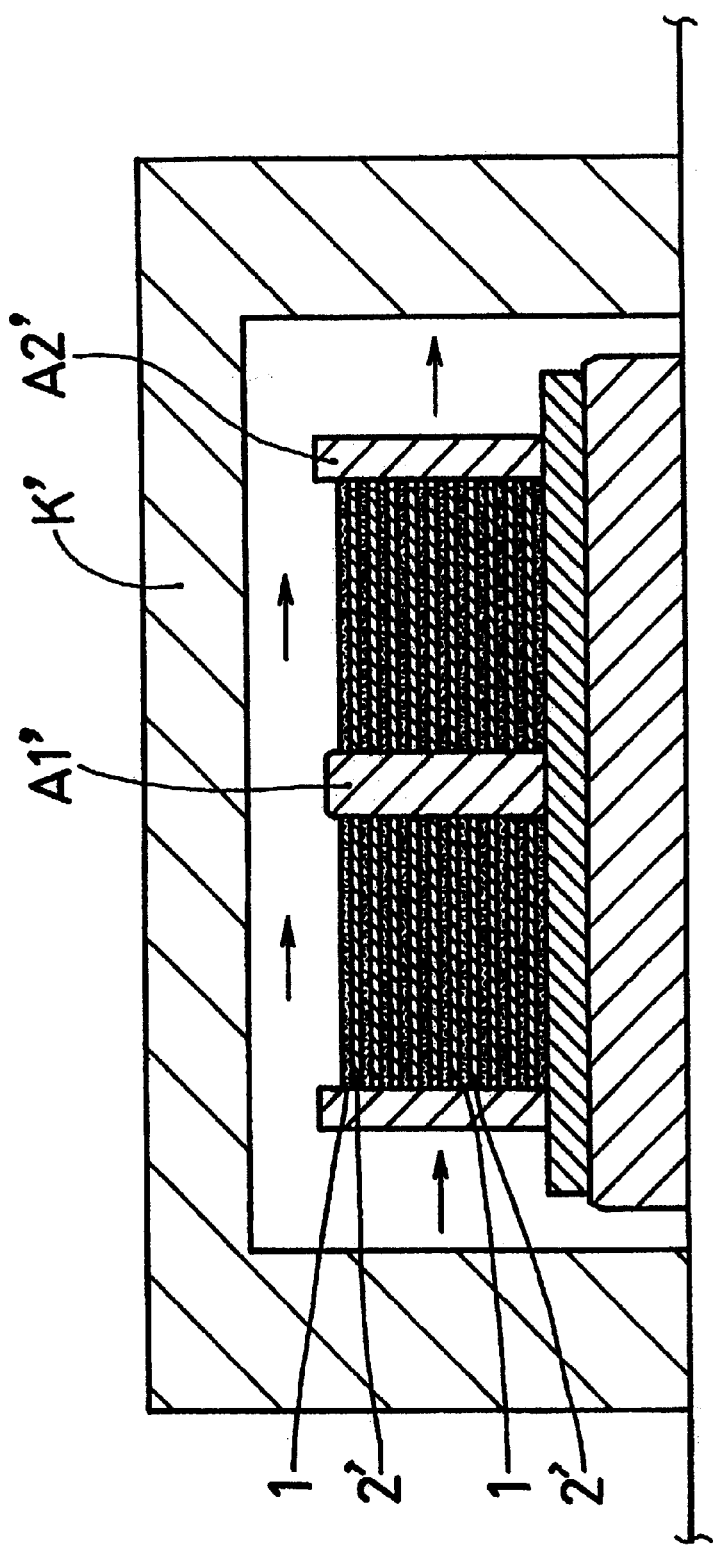
FIG. 5 is an explanatory view showing another conventional method (Method 2) for preheating a laminate structure.

(2) In the above-stated embodiment, positioning of the laminate structure S is conducted using the central core A1', but is should not be limited thereto. Alternatively, an outer frame may be employed for positioning in a manner of pressing the outer periphery of the laminate structure S. The outer frame may be formed similarly to the outer frame A2' as shown in FIG. 5. This is useful in preheating a laminate structure with no bore h.

Figure 3:
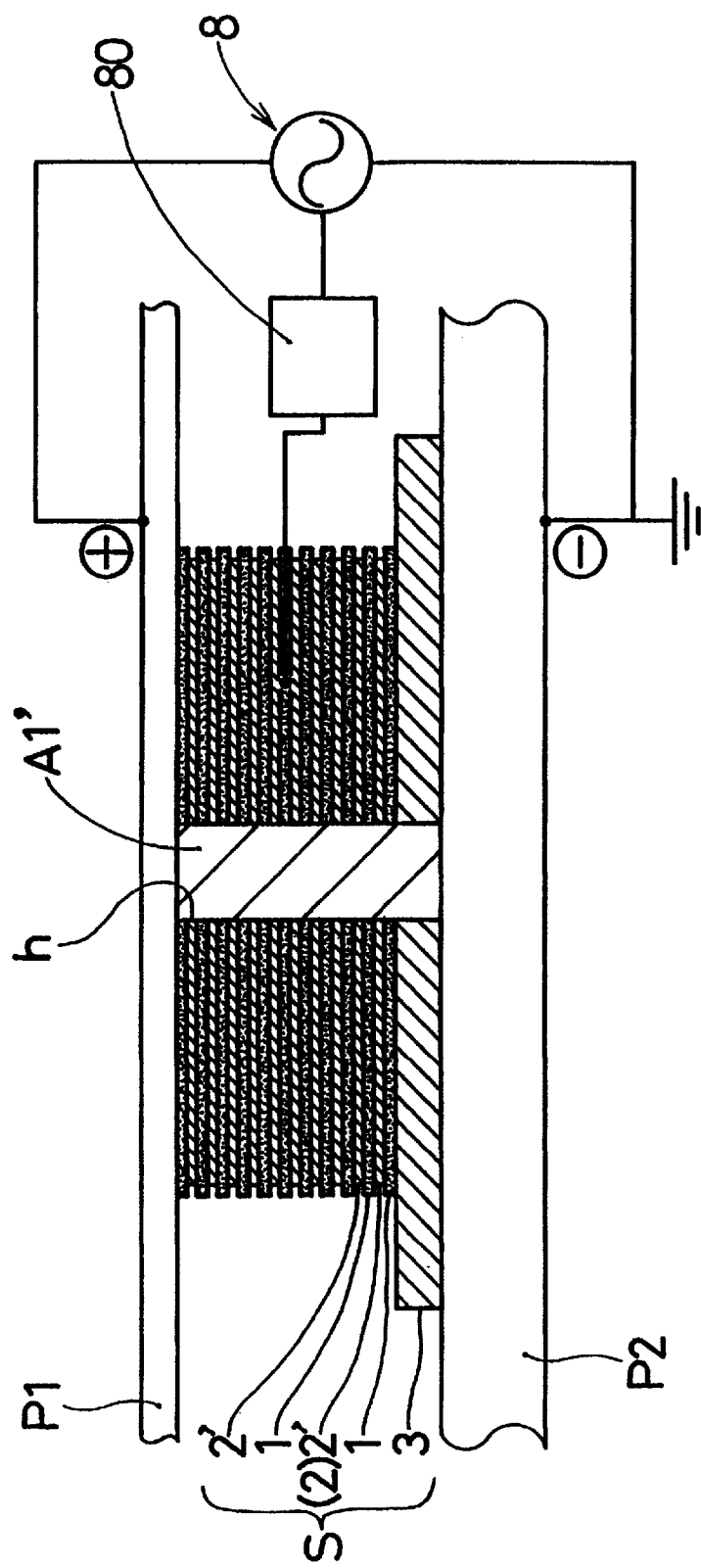
FIG. 3 is an explanatory diagram of another embodiment of apparatus for preheating a laminate structure according to the present invention.
Figure 4:
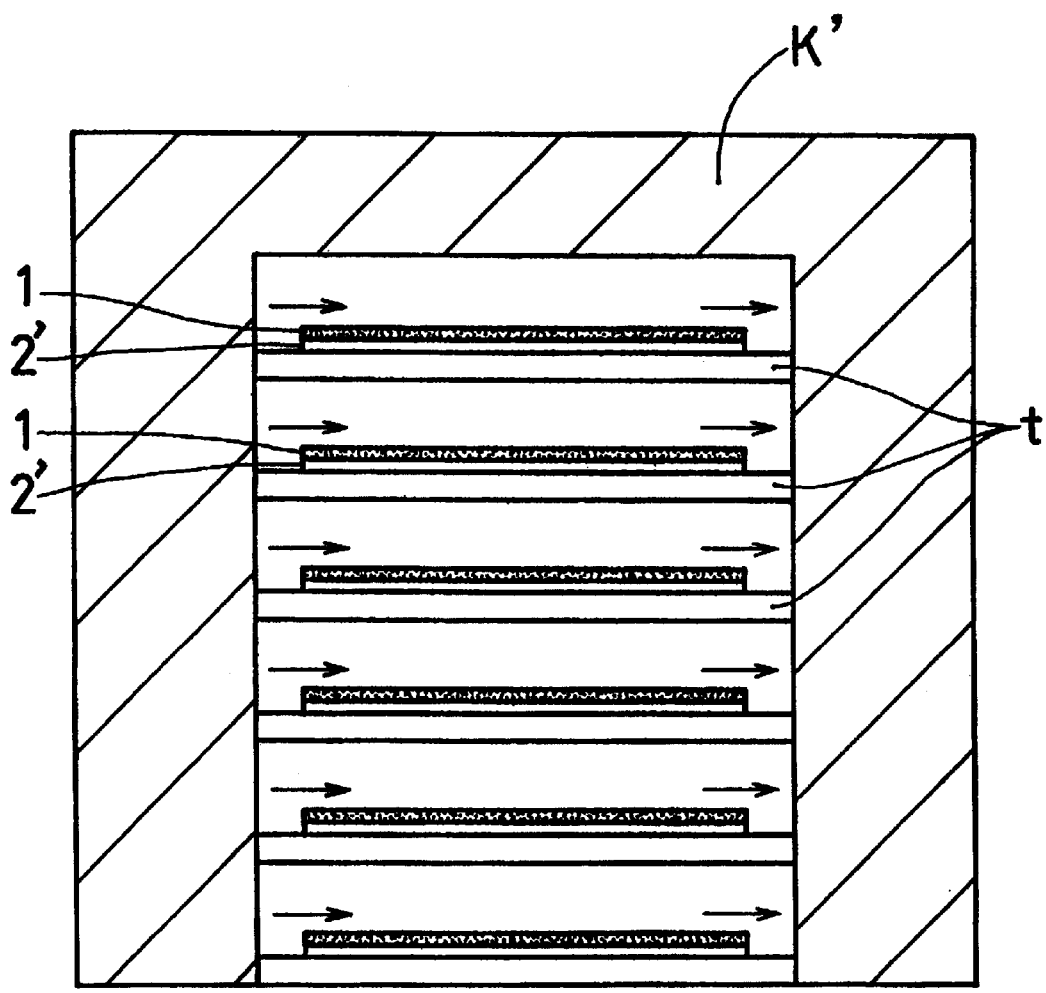
FIG. 4 is an explanatory view showing a conventional method (Method 1) for preheating a laminate structure.

(3) In case of preheating a laminate structure S with flanges 3, one of the flanges 3 is removed as shown in FIG. 3 and preheated for the purpose of easier setting of an intermediate split-type mold for the subsequent cure molding process.

(4) Regardless of existence of flanges or dimensions of raw rubber plates 1 and steel plates 2', as far as a laminate structure S has an alternate lamination with a plurality of raw rubber plates 1 and steel plates 2', preheating thereof to a desired temperature uniformly and in a short time can be conducted similar to the above-described embodiment.

The laminate structure S of the above embodiment includes eleven raw rubber plates 1 and ten steel plates 2'. But the numbers of respective plates should not be limited thereto and any numbers of plates may provide similar excellent effects. Especially, a laminate structure S having a larger numbers of raw rubber plates 1 and steel plates 2' (for example, about 41 raw rubber plates 1 and about 40 steel plates 2'), provides an extremely superior effect to a conventional one.

(5) Laminated bodies used for other than antiseismic or quake-absorbing apparatus may include, in addition to raw rubber plates, polymer plates of diene type elastomer (e.g. natural rubber), non-diene type elastomer, thermoplastic elastomer-type, liquid rubber type, thermoplastic resin or thermosetting resin etc.

(6) It is preferable that the steel plates 2' of the laminate structure S are parallel each other because the surfaces of the steel plates 2' may obtain further uniformed electromagnetic strength due to the applied high-frequency voltage. In some instances depending on purposes, a laminate structure S may have steel plates not parallel each other. In this case, dummies made of nonconductive material or the like may be interposed in a narrower side of the interval between two steel plates 2' so as to adjust the interval difference in terms of high-frequency.

(7) A high-frequency voltage may flow in various fashions as far as it may be applied to the laminate structure S in its lamination directions through electrode. One example is to make two output lines from the high-frequency oscillator 8 connectable to conductive metal members (e.g. providing gripping elements at tip portions thereof) and connect them with associated electrodes P1, P2.

Alternatively, in case of the laminate structure S having conductive metal flanges, the output lines may be connected to these flanges. The outermost steel plates 2' may be connected with the output lines so as to serve concurrently as electrodes. Further, one of the output terminals may be connected to a steel plate 2' located substantially in the middle of the laminated layers and the other output terminals to both ends of the grounded laminate structure S (a non-parallel feeding system). Furthermore, both ends of the laminate structure S may be grounded and output terminals may be connected to two steel plates 2' respectively located approximately at ⅓ and ⅔ positions of the laminate structure (in the lamination directions) (a parallel feeding system). In these fashions, respective raw rubber plates 1 may uniformly receive dielectric heating.

B. Apparatus for Manufacturing a Laminated Body

Figure 6:
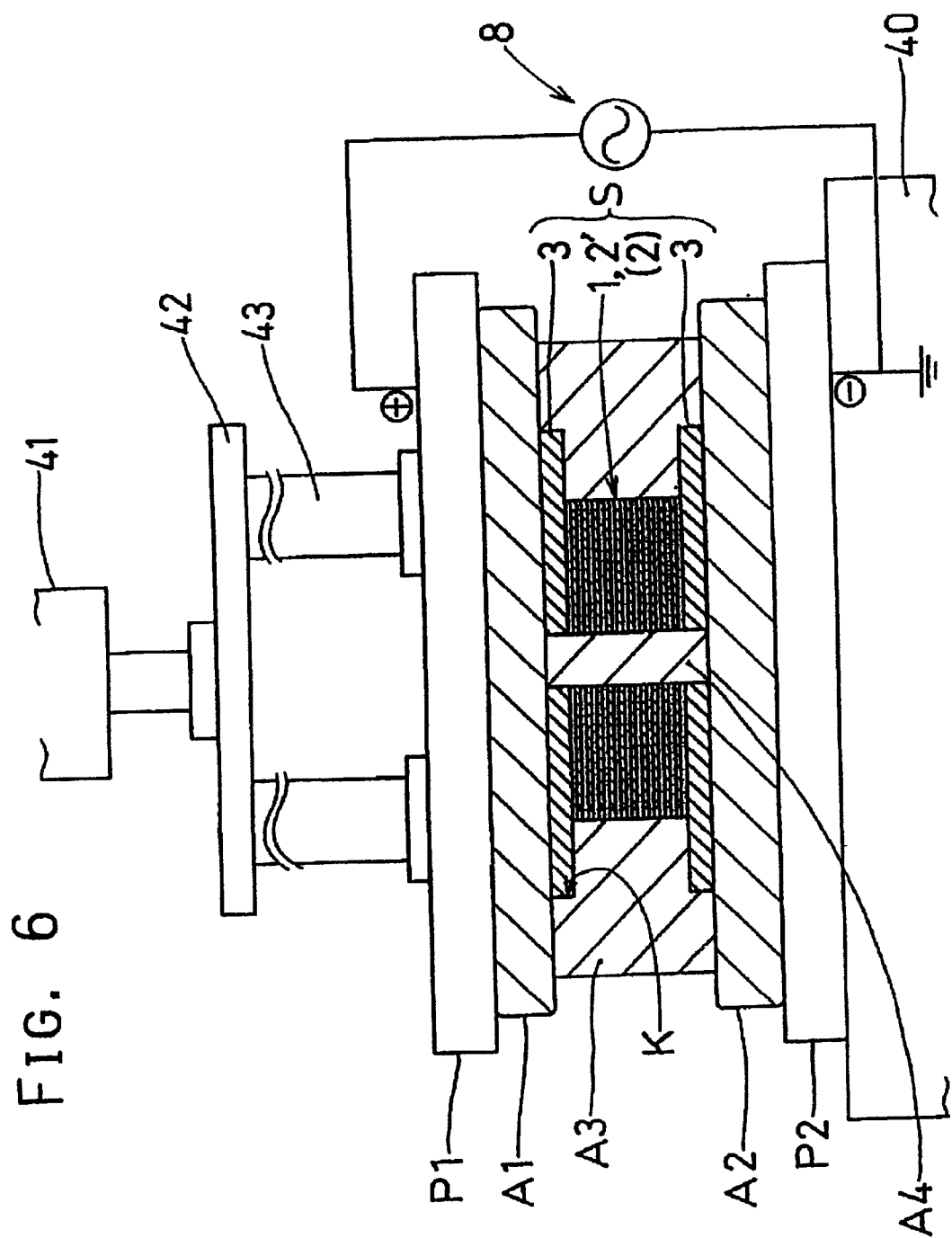
FIG. 6 is an explanatory diagram of an embodiment of apparatus for manufacturing a laminated rubber body according to the present invention.

FIG. 6 shows apparatus for manufacturing a laminated body S having extruding flanges 3 on its upper and lower sides in using the dielectric heating method.

Figure 7:
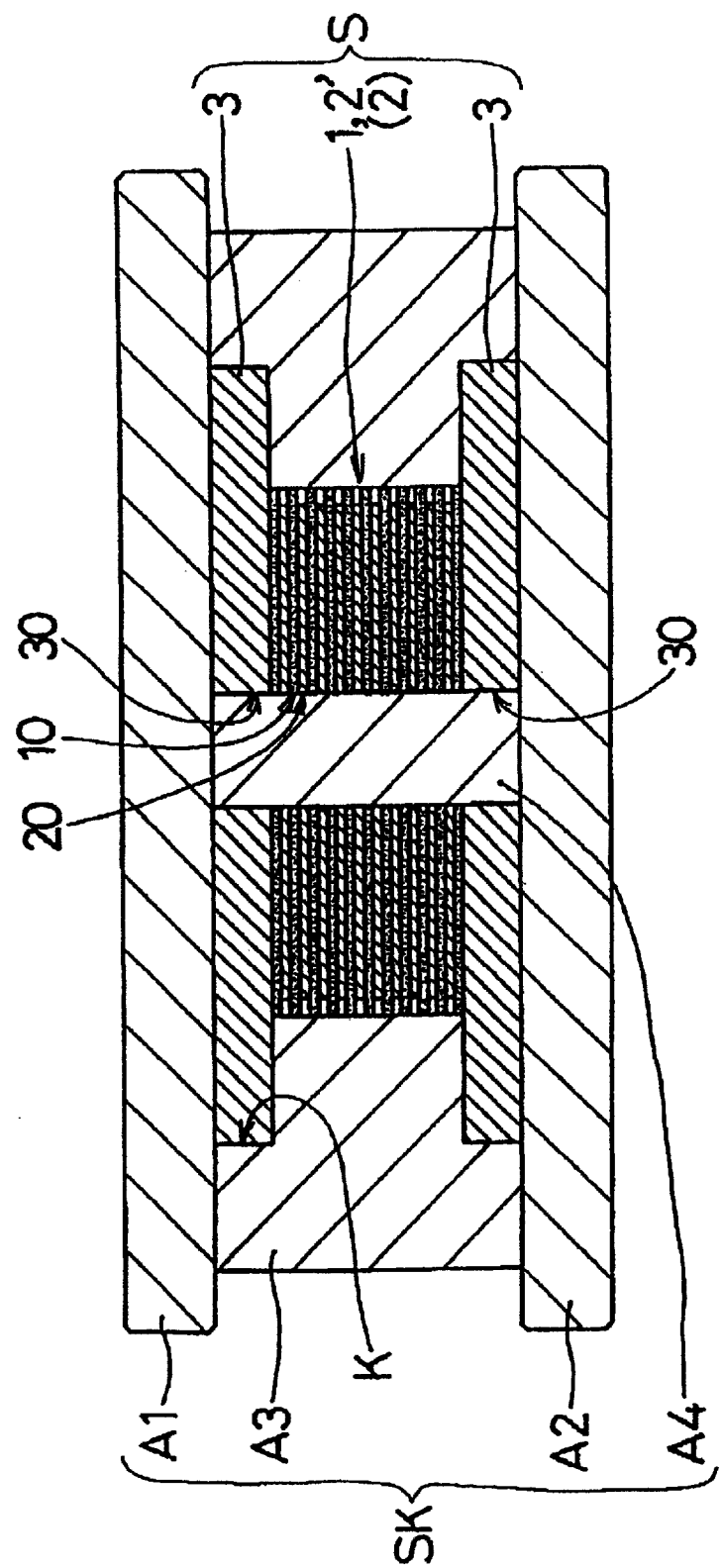
FIG. 7 is an explanatory view showing a mold employed in the apparatus of FIG. 6 and a laminate structure accommodated in an inner space of the mold.

As shown in FIG. 7, this manufacturing apparatus accommodates a laminate structure S in an interior space K defined by an intermediate mold A3, a central core A4 and upper and lower molds A1, A2. Referring back to FIG. 6, while a high-frequency voltage generated by a high-frequency oscillator 8 is applied to between the upper and lower molds A1, A2 via parallel electrode plates P1, P2, pressure is applied by a press machine in directions in which the upper and lower molds A1, A2 approach each other.

Major constituent elements in the apparatus for manufacturing a laminated rubber body are now be described in details.

(a) Laminated Body S

As shown in FIG. 7, a laminate structure S includes circular raw rubber plates 1 with holes 10 and steel plates 2' with hole 20 which are laminated alternately, and further includes flanges 3 with holes 30 on its upper and lower sides. The steel plates 2' corresponds conductive metal plates 2 as stated above. It is preferable to interpose adhesive members between the raw rubber plates 1 and the steel plates 2'. The adhesive members include, for example, a combination of phenol type polymer and chlorine type polymer etc.

Particular dimensions of the raw rubber plates 1, the steel plates 2' and the flanges 3 are as follows:

Raw Rubber Plate 1;
 diameter: 520 mm, thickness: 6 mm, hole diameter: 90 mm Steel plate 2';
 diameter: 500 mm, thickness: 3 mm, hole diameter: 90 mm Flange 3;
 diameter: 600 mm, thickness: 25 mm, hole diameter: 90 mm (b) High-Frequency Oscillator 8

The high-frequency oscillator 8 is constituted with a known circuit and set to generate a frequency of 13.6 MHz. A frequency employed in high-frequency dielectric heating is generally within the range of 4–80 MHz, but any frequency in the range of 1–300 MHz may be applicable.

The high-frequency oscillator 8 is provided with a temperature sensor for detecting the temperature of raw rubber plates 1 and stops the output when two hours have passed after the temperature reaches 140° C.

(c) Upper and Lower Molds A1, A2

The upper and lower molds A1, A2 are formed with circular steel plates the diameter of which is larger than that of the intermediate mold A3 provided therebetween.

(d) Intermediate Mold A3 and Central Core A4

Material suitable for the intermediate mold A3 and the central core A4 should have a loss coefficient (dielectric constant×dielectric loss tangent) of not higher than 0.3, preferably not higher than 0.15 (measuring method: JIS K 6911, testing conditions: temperature 20±2° C., relative humidity 65±5%, testing frequency: 1 MHZ), and be superior in strength and heat resistance, have a small coefficient of linear expansion and a low absorption rate, and be available at low cost. Specific examples are compounds of phenol resin, epoxy resin, ester resin and respective glass fibers or ceramics. The reason why the loss coefficient is set to not larger than 0.3 is that, if it becomes larger than that, internally generated heat in the intermediate mold A3 and the central core A4 becomes extremely higher than that in the raw rubber plates 1 so that there is local rise in temperature in the vicinity of the intermediate mold A3 and the central core A4 and results in failure of uniform heating of the raw rubber plates 1

Although not shown in the drawings, the intermediate mold A3 is constituted as a split-mold so that the resultant laminated rubber body (i.e. the laminate rubber structure S after cure-adhesion) is removal from the intermediate mold A3.

(e) Parallel Electrode Plates P1, P2

Parallel electrode plates P1, P2 have a slightly larger diameter than that of the above upper and lower molds A1, A2, and are made of steel plates. With heating means (not shown), they function as heat boards. Heating means may have arrangements in which vapor or heated fluid such as oil is flowed within the respective parallel electrode plates P1, P2 or in which electro-thermal lines are embedded in the parallel electrode plates P1, P2. The reason for providing such heating means is to avoid heat radiation from the upper and lower molds A1, A2 and eliminate the temperature difference between the inner side and the outer side of the laminate structure S. Therefore, the temperature of the parallel electrode plates P1, P2 is set to rise depending on the detection temperature of the temperature sensor provided in the high-frequency oscillator 8.

(f) Function of Dielectric Heating Apparatus

As shown in FIG. 6, when the laminate structure S is positioned between the parallel electrode plates P1, P2 and a high-frequency voltage generated by the high-frequency oscillator 8 is applied to between the parallel electrode plates P1, P2 the steel plates 2' disposed at equal intervals function as intermediate electrode plates. The raw rubber plates 1 are all simultaneously thoroughly heated regardless of which portions thereof. This function and the function of the heading means provided in the parallel electrode plates P1, P2 being combined, the laminate structure S is heated to reach the curing temperature uniformly and in a short time. This is apparent from FIG. 8. That is, with this apparatus, the temperature of the laminate structure S reaches a rubber fluid-molding temperature region (80–95° C.) uniformly in the inner and outer portions by a 30 minutes' output of the high-frequency oscillator 8. By a one-and-half-hour output thereof, the temperatures of both the inner and outer sides reach a cure-adhesion temperature region (110–125° C.), and by a three-hours' output thereof, to a cure-completion temperature region (140° C.).

Figure 8:
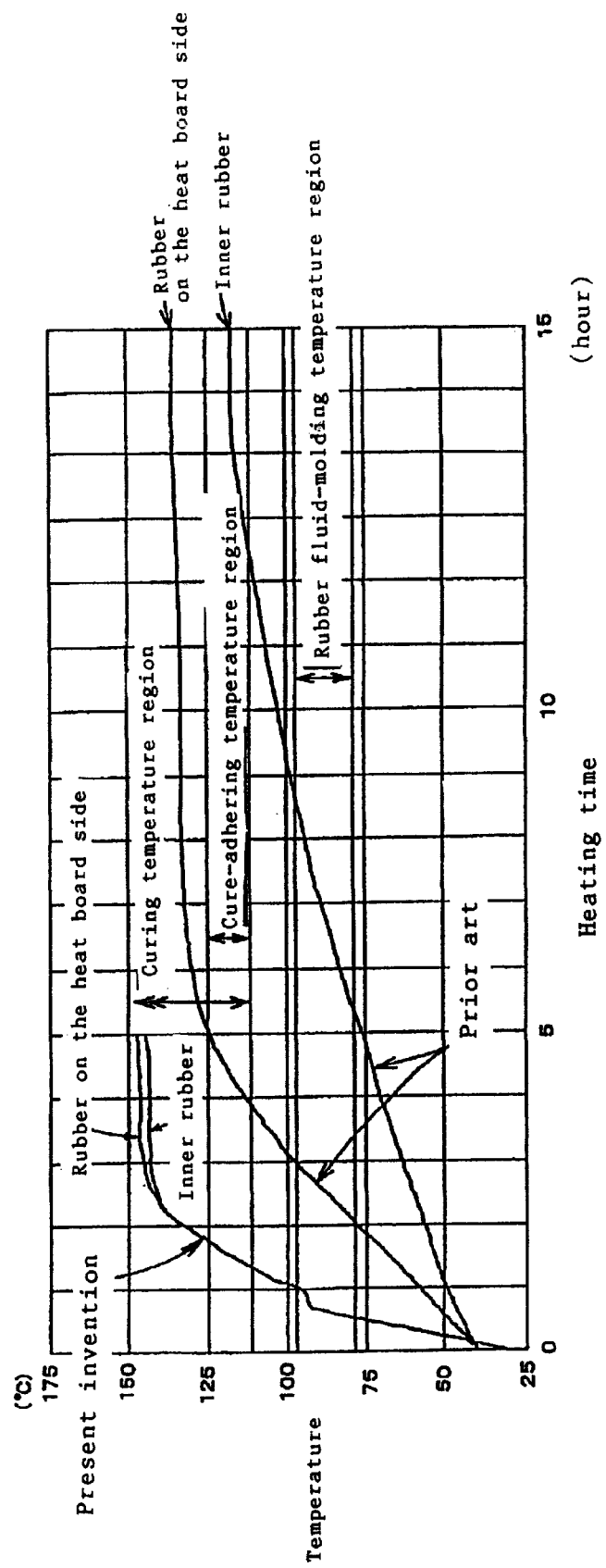
FIG. 8 is a graph showing relationship between the inside and outside temperatures of the laminate rubber structure and the heating time in case of manufacturing by a conventional method and apparatus and in case by the method and apparatus of the present invention.

The following are apparent from the above and FIG. 8.

(1) While it takes more than 15 hours to manufacture a laminated rubber body with conventional methods and apparatus which employ only the external heating method, it is possible to complete a laminated rubber body in about five hours with the embodiment according to the manufacturing method and apparatus of the present invention.

(2) In the conventional methods and apparatus using only the external heating method, curing progresses with a large temperature difference between an inner and an outer portion of the laminate structure, and thereby resulting in poor substantial characteristics. On the other hand, curing in the manufacturing method and apparatus of the present invention progresses with little temperature difference therebetween and thereby resulting in superior substantial characteristics.

(g) Press Machine

As shown in FIG. 6, a press machine includes a base 40 a hydraulic cylinder 41 provided above the base 40 a pressing plate 42 attached to an end of an output shaft of the hydraulic cylinder 41 and rod-like pressing members 43 made of non-conductive material and vertically fixed to the pressing plate 42. In this embodiment, one of the above-mentioned parallel electrode plates P1 is attached to lower ends of the rod-like pressing members 43 while the other of the parallel electrode plates P2 is attached to an upper surface of the base 40.

With the start of dielectric heating and heating by the parallel electrode plates P1, P2, pressure is simultaneously applied by the press machine in a direction in which the upper and lower molds A1, A2 approach each other. And when the temperatures of the inner and outer portions reach the above-described rubber fluid-molding temperature region, the pressure reaches the highest set pressure for securing product dimensions.

(h) Another Embodiments of the laminated rubber body (1) In the foregoing embodiments, the dielectric heating of respective raw rubber plates 1 is conducted in a manner such that the laminate structure S is disposed between the parallel electrode plates P1, P2, and the raw rubber plates 1, the conductive metal plates 2 and the electrode plates P1, P2 are all parallel each other, and by applying a high-frequency voltage between the parallel electrode plates P1, P2. Instead of this arrangement, the raw rubber plates 1 may be heated by applying a high-frequency voltage between the upper and lower molds A1, A2 which are parallel to the raw rubber plates 1 and the conductive metal plates 2. In this case, with providing heating means in the upper and lower molds A1, A2, they may function as heating boards.

Other alternatives include an arrangement in which heating boards are contacted with the parallel electrodes P1, P2 or the upper and lower molds A1, A2 so as to allow heat transfer.

Figure 9:
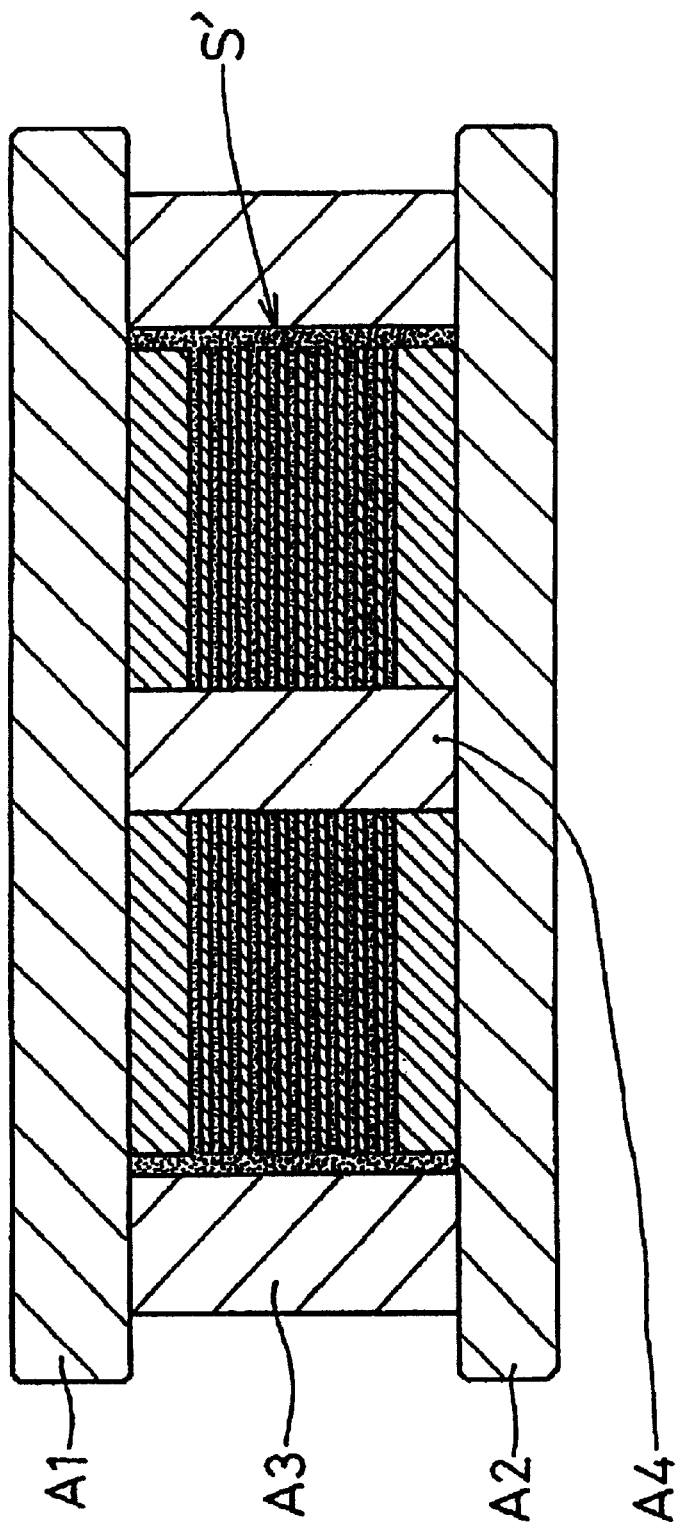
FIG. 9 is an explanatory view showing another embodiment of a mold for manufacturing a laminated rubber body and a laminate rubber structure accommodated in an inner space of the mold according to the present invention
Figure 10:
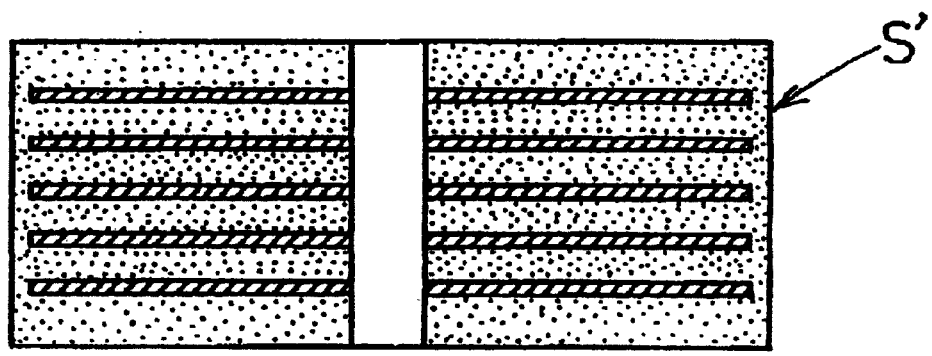
FIG. 10 is a sectional view of another embodiment of a laminated rubber body manufactured by the method and apparatus for manufacturing a laminated body according to the present invention.
Figure 11:
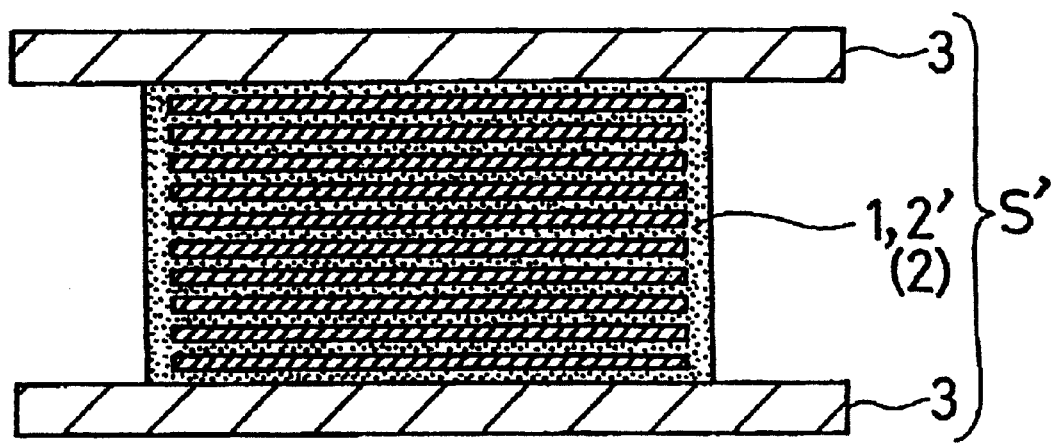
FIG. 11 is a sectional view of another embodiment of a laminated rubber body manufactured by the method and apparatus according to the present invention.

(2) Using the manufacturing method and apparatus of the present invention, even a laminated rubber body S' as shown in FIG. 9 may be similarly manufactured in a short time and given superior substantial characteristics. This holds true for a laminated rubber body S' having no flange in FIG. 10 and another laminated rubber body S' having no central through bore as shown in FIG. 11.

(3) Regardless of existence of flanges or dimensions of raw rubber plates 1 and steel plates 2', as far as a laminate structure has an alternate lamination with a plurality of raw rubber plates 1 and steel plates 2', it may be similarly completed in a short time with superior substantial characteristics. The above laminated bodies S' (FIGS. 9 and 10) include eleven raw rubber plates 1 and ten steel plates 2'. However, the numbers of respective plates are not limited thereto, but a structure with any numbers of plates may become an excellent product.

(4) In cases of a thick laminate rubber structure having a large number of raw rubber plates 1 and steel plates 2'. rise in temperature up to the curing temperature range may be obtained with little temperature difference between the inner and outer portions and in a short time by reversing polarity of the parallel electrode plates P1, P2 or the upper and lower molds A1, A2 every fixed time. In this case, it is necessary to make the upper surface side of the base 40 in the press machine of non-conductive material.

(5) Instead of the raw rubber plates 1 of the above embodiment, other polymer plates made of diene type elastomer (e.g. natural rubber), non-diene type elastomer, thermoplastic elastomer-type, liquid rubber type or the like may be employed.

(6) It is preferable that the steel plates 2' of the laminate structure S are parallel each other because the surfaces of the steel plates 2' may obtain further uniformed electromagnetic strength due to the applied high-frequency voltage. In some instances depending on purposes, a laminate structure S may have steel plates not parallel each other. In this case, dummies made of nonconductive material or the like may be interposed in a narrower side of the interval between two steel plates 2' so as to adjust the interval difference in terms of high-frequency.

(7) A high-frequency voltage may flow in various fashions as far as it may be applied to the laminate structure S in its lamination directions through electrode. One example is to make two output lines from the high-frequency oscillator 8 connectable to conductive metal members (e.g. providing gripping elements at tip portions thereof) and connect them with associated electrodes P1, P2. Alternatively, in case of a laminate structure S with conductive metal flanges, the output lines may be connected to these flanges. The outermost steel plates 2' may be connected with the output lines so as to serve concurrently as electrodes. Further, one of the output terminals may be connected to a steel plate 2' located substantially in the middle in the laminated layers and the other output terminals to both ends of the grounded laminate structure S (a non-parallel feeding system). Furthermore, both ends of the laminate structure S may be grounded and output terminals may be connected to two steel plates 2' respectively located approximately at $\frac{1}{3}$ and $\frac{2}{3}$ positions of the laminate structure (in the lamination directions) (a parallel feeding system). In any fashion, respective raw rubber plates I may uniformly receive dielectric heating.

The pressing plates of the press machine may be also used as electrodes.

(i) Other Embodiment of Laminated Bodies (1) A laminated body with alternate lamination with polymer plates other than raw rubber plates and conductive metal plates may be manufactured using a similar method with the manufacturing apparatus of the present invention.

Material for the polymer plates may include, for example, widely used thermoplastic synthetic resin, thermosetting synthetic resin, widely used rubber or thermoplastic elastomer.

(2) In case of a laminated rubber body, the press machine is actuated from the beginning of the dielectric heating process. However, this is not necessarily required depending on types of laminated bodies. That is, it is sufficient that the press machine works at least after completion of the dielectric heating.

Effect of the Invention

The constitution of the present invention stated above provides following effects and advantages.

The present invention provides a method for preheating a laminated body in which polymer plates incorporated in the laminated body are heated up to a specific temperature range with substantially uniform temperature distribution and in a short time. The present invention also provides a method and apparatus for manufacturing a laminated body in which a laminate structure is heated up to a specific temperature range with little temperature difference between the inner and outer portions and in a short time.

What is claimed is:

1. A method for preheating a laminate structure comprising:
providing a laminate structure having alternating lamination with a plurality of polymer plates and conductive metal plates;
applying, through electrodes, a high-frequency voltage in a lamination direction of said laminate structure so as to dielectrically heat said polymer plates to produce a unified body of said plurality of polymer plates and conductive metal plates.

2. A method for preheating a laminate structure according to claim 1, wherein said plurality of conductive metal plates are parallel with each other.

3. A method for preheating a laminate structure according to claim 1, wherein intervals between any adjacent conductive metal plates are substantially of the same.

4. A method for preheating a laminate structure according to claim 1, wherein said high-frequency voltage is applied between the electrodes disposed on opposite ends of said laminate structure in the lamination direction.

5. A method for preheating a laminate structure according to claim 1, wherein the outermost opposite conductive metal plates of said laminate structure function as said electrodes.

6. A method for preheating a laminate structure according to claim 1, wherein flanges made of conductive metal plates are provided on outer faces of the outermost opposite plates of said laminate structure and function as said electrodes.

7. A method for preheating a laminate structure according to claim 1, wherein conductive metal plates are provided in a manner of contacting with outer faces of the outermost opposite plates of said laminate structure and function as said electrodes.

8. A method for preheating a laminate structure according to claim 1, wherein said electrodes are heated by heating means.

9. A method for preheating a laminate structure according to claim 1, wherein said laminate structure has a through bore in the lamination direction and a core member made of non-conductive material is inserted into said through bore so as to position said plurality of polymer plates and conductive metal plates.

10. A method for preheating a laminate structure according to claim 9, wherein said core member has a coefficient of dielectric loss not higher than 0.3.

11. A method for preheating a laminate structure according to claim 1, wherein an annular housing member surrounds said laminate structure in contact with the peripheral lamination surface thereof so as to position said plurality of polymer plates and conductive metal plates.

12. A method for preheating a laminate structure according to claim 11, wherein said housing member has a coefficient of dielectric loss not higher than 0.3.

13. A method for manufacturing a unified body having alternate lamination with a plurality of polymer plates and conductive metal plates comprising:
accommodating a laminate structure having alternate lamination with a plurality of polymer plates and conductive metal plates in an annular housing member which is made of non-conductive material and surrounds said laminate structure in contact with a peripheral lamination surface thereof;
applying, through electrodes, a high-frequency voltage to said laminate structure in a lamination direction so as to dielectrically heat said polymer plates; and
applying pressure to said laminate structure in said lamination direction by a pressing means at least after completion of said high-frequency voltage applying process.

14. A method for manufacturing a laminated body according to claim 13, wherein said plurality of conductive metal plates are parallel to each other.

15. A method for manufacturing a laminated body according to claim 13, wherein intervals between any adjacent metal plates are substantially the same.

16. A method for manufacturing a laminated body according to any of claims 13, 14, wherein heating by heating means is also provided under the process of applying said high-frequency voltage.

17. A method for manufacturing a laminated body according to claim 13, wherein polarity of said high-frequency voltage is reversed every fixed time.

18. A method for manufacturing a laminated body according to claim 13, wherein said high-frequency voltage is applied between the electrodes provided on opposite ends of said laminate structure in the lamination direction.

19. A method for manufacturing a laminated body according to claim 18, wherein said electrodes are pressing plates made of conductive metal plate as said pressing means.

20. A method for manufacturing a laminated body according to claim 13, wherein said electrodes are the outermost opposite conductive metal plates of said laminate structure.

21. A method for manufacturing a laminated body according to claim 13, wherein flanges made of conductive metal plates are provided on the opposite outermost sides of said laminate structure and function as said electrodes.

22. A method for manufacturing a laminated body according to claim 13, wherein said electrodes are conductive metal plates provided in a manner of contacting with the outer faces of the outermost opposite plates of said laminate structure.

23. A method for manufacturing a laminated body according to claim 13, wherein said electrodes are heated by heating means.

24. A method for manufacturing a laminated body according to claim 13, wherein the dielectric heating is conducted in a manner such that a central core made of nonconductive material is inserted in a through bore of said laminate structure extending in the lamination direction.

25. Apparatus for manufacturing a unified laminated body by heat integrating a laminate structure having alternative lamination with a plurality of polymer plates and conductive metal plates, said laminate structure having a peripheral lamination surface, comprising:
an annular housing member which is made of non-conductive material and surrounds the laminate structure in contact with said peripheral lamination surface;
dielectric heating means for dielectrically heating said polymer plates by applying a high-frequency voltage to said laminate structure in a lamination direction through electrodes; and
pressing means to press the laminate structure in the lamination direction.

26. Apparatus for manufacturing a laminated body according to claim 25, wherein said pressing means gives pressure at least after completion of a high-frequency voltage applying process.

27. Apparatus for manufacturing a laminated body according to claim 25, wherein said dielectric heating means has switching means for reversing polarity of said high-frequency voltage every fixed time.

28. Apparatus for manufacturing a laminated body according to claim 25, wherein electrodes receiving said high-frequency voltage are provided at opposite ends of said laminate structure in the lamination direction.

29. Apparatus for manufacturing a laminated body according to claim 25, wherein outermost opposite conductive metal plates of said laminate structure function as said electrodes, and said dielectric heating means is capable of applying said high-frequency voltage between these outermost opposite conductive metal plates.

30. Apparatus for manufacturing a laminated body according to claim 25, wherein flanges made of conductive metal plates and provided on outermost opposite sides of said laminate structure function as said electrodes, and said dielectric heating means is capable of applying the high-frequency voltage between these flanges.

31. Apparatus for manufacturing a laminated body according to claim 25, wherein conductive metal plates provided in a manner of contacting with outer faces of outermost opposite plates of said laminate structure function as said electrodes, and the dielectric heating means is capable of applying said high-frequency voltage between these conductive metal plates.

32. Apparatus for manufacturing a laminated body according to claim 25, wherein said pressing means includes pressing plates made of conductive metal material and applies pressure to said laminate structure during the dielectric heating, and said dielectric heating means is capable of applying said high-frequency voltage between these pressing plates.

33. Apparatus for manufacturing a laminated body according to claim 25, wherein said electrodes are provided with heating means.

34. Apparatus for manufacturing a laminated body according to claim 25 further comprising a non-conductive positioning means for positioning said plurality of polymer and conductive metal plates to be laminated, said positioning means includes a core member to be inserted in a through bore provided in said laminate structure and extending in the lamination direction.

35. Apparatus for manufacturing a laminated body according to claim 34, wherein at least one of said housing member and said core member has a coefficient of dielectric loss not higher than 0.3.

36. Apparatus for manufacturing a laminated body according to claim 34, wherein said positioning means supports the peripheral lamination surface of said laminate structure.

37. Apparatus for manufacturing a laminated body according to claim 34, wherein said laminate structure has a through bore extending in the lamination direction and said positioning means supports an inner peripheral surface of said laminate structure which defines said through bore.

38. Apparatus for manufacturing a laminated body according to claim 34, wherein said positioning means has a coefficient of dielectric loss not higher than 0.3.

39. Apparatus for manufacturing a laminated body according to claim 25, wherein said housing member is a split-mold.

* * * * *

UNITED STATES PATENT AND TRADEMARK OFFICE
CERTIFICATE OF CORRECTION

PATENT NO. : 6,359,273 B1
DATED : March 19, 2002
INVENTOR(S) : Kiyoshi Ogawa et al.

It is certified that error appears in the above-identified patent and that said Letters Patent is hereby corrected as shown below:

Column 14,
Line 21, delete "claim 18" and replace with -- claim 13 --

Signed and Sealed this

Twenty-second Day of April, 2003

JAMES E. ROGAN
*Director of the United States Patent and Trademark Office*